US012541069B2

(12) United States Patent
Johnston et al.

(10) Patent No.: US 12,541,069 B2
(45) Date of Patent: Feb. 3, 2026

(54) OPTICAL FIBER CABLE (71) Applicant: CORNING RESEARCH & DEVELOPMENT CORPORATION, Corning, NY (US)

(72) Inventors: Peter J. Johnston, Taylorsville, NC (US); Christopher Mark Quinn, Hickory, NC (US); David Alan Seddon, Advance, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 19/273,996

(22) Filed: Jul. 18, 2025

(65) Prior Publication Data

US 2026/0023232 A1 Jan. 22, 2026

Related U.S. Application Data (60) Provisional application No. 63/846,498, filed on Jul. 18, 2025, provisional application No. 63/673,367, filed on Jul. 19, 2024.

(51) Int. Cl.
*G02B 6/44* (2006.01)
(52) U.S. Cl.
CPC .................... *G02B 6/443* (2013.01)
(58) Field of Classification Search
CPC ....................................................... G02B 6/44
USPC ......................................................... 385/100
See application file for complete search history.

(56) References Cited

U.S. PATENT DOCUMENTS

| | | | | |
|---|---|---|---|---|
| 6,895,155 B2 * | 5/2005 | Gasca | ................ | G02B 6/02314 385/12 |
| 9,658,393 B2 * | 5/2017 | Digiovanni | ............ | G02B 6/032 |
| 11,156,768 B2 | 10/2021 | Digiovanni et al. | | |
| 11,747,552 B1 * | 9/2023 | Cataletto | .............. | G02B 6/3807 385/125 |
| 11,835,755 B2 | 12/2023 | Harker et al. | | |
| 2002/0136511 A1 | 9/2002 | Cecchi et al. | | |
| 2003/0174977 A1 * | 9/2003 | Mayer | .................. | G02B 6/4411 385/100 |
| 2005/0103518 A1 * | 5/2005 | Glew | .................... | G02B 6/4489 174/113 C |
| 2007/0047885 A1 * | 3/2007 | Mayer | .................. | G02B 6/4403 385/100 |

(Continued)

FOREIGN PATENT DOCUMENTS

| | | |
|---|---|---|
| WO | 2023/234355 A1 | 12/2023 |
| WO | 2024/015049 A1 | 1/2024 |
| WO | 2024/035511 A1 | 2/2024 |

OTHER PUBLICATIONS

International Search Report and Written Opinion of the International Searching Authority; PCT/US2025/037299; mailed on Nov. 4, 2025; 9 pages; Commissioner for Patents.

*Primary Examiner* — Kaveh C Kianni
(74) *Attorney, Agent, or Firm* — Russell S. Magaziner (57) ABSTRACT

An optical fiber cable includes a hollow-core optical fiber. The cable is configured to have a low excess fiber length (EFL) of the hollow-core fiber. The cable is further configured to maintain a high minimum bending radius of the hollow-core fiber to prevent permanent damage to the hollow-core fiber during installation and operation of the cable.

20 Claims, 7 Drawing Sheets

(56) References Cited

U.S. PATENT DOCUMENTS

| | | | |
|---|---|---|---|
| 2007/0237460 A1* | 10/2007 | Fan | G01N 21/7746 |
| | | | 385/12 |
| 2009/0059966 A1* | 3/2009 | Mayer | G02B 6/4403 |
| | | | 385/105 |
| 2021/0396927 A1* | 12/2021 | Harker | H04B 10/073 |
| 2022/0187532 A1 | 6/2022 | Unnimadhava Kurup Soudamini Amma et al. | |
| 2023/0014659 A1 | 1/2023 | Corrado et al. | |
| 2024/0176088 A1 | 5/2024 | Blazer et al. | |

\* cited by examiner

OPTICAL FIBER CABLE

This Application claims the priority benefit of U.S. Application No. 63/846,498 filed Jul. 18, 2025 and U.S. Application No. 63/673,367 filed Jul. 19, 2024, each of which is hereby incorporated by reference herein in its entirety.

BACKGROUND

The present disclosure relates to optical fiber cable, and more specifically to non-stranded optical fiber cables supporting specialized optical fibers, such as optical fibers designed to communicate optical signals through a hollow core.

Optical fiber cables may include one or more optical fibers disposed within a cable jacket. The optical fiber may include a core, a cladding, and a coating surrounding the cladding to protect the optical fiber. The core may be solid glass through which an optical signal may propagate. However, specialized optical fibers have been developed, such as those formed with a hollow core or free space in air or a vacuum along which an optical signal may propagate. Due to propagation of an optical signal in air or vacuum rather than a solid glass core, latency of an optical signal may less. Different hollow-core and other specialized optical fibers have varying designs. Some such specialized or new optical fibers may break or attenuate when packaged in a cable or otherwise handled.

A need exists for new cables and methods of making and handling the same that support such optical fibers.

SUMMARY OF THE DISCLOSURE

The following is a brief summary of subject matter that is described in greater detail herein. This summary is not intended to be limiting as to the scope of the claims.

According to an Aspect an optical fiber cable includes a hollow-core optical fiber. The cable is configured to have a low excess fiber length of the hollow-core fiber, and is further configured to maintain a high minimum bending radius of the hollow-core fiber to prevent damage to the hollow-core fiber during installation and operation of the cable.

The above summary presents a simplified summary in order to provide a basic understanding of some aspects of the systems and/or methods discussed herein. This summary is not an extensive overview of the systems and/or methods discussed herein. It is not intended to identify key or critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Various technologies pertaining to an optical fiber cable including at least one hollow-core fiber are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices may be shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
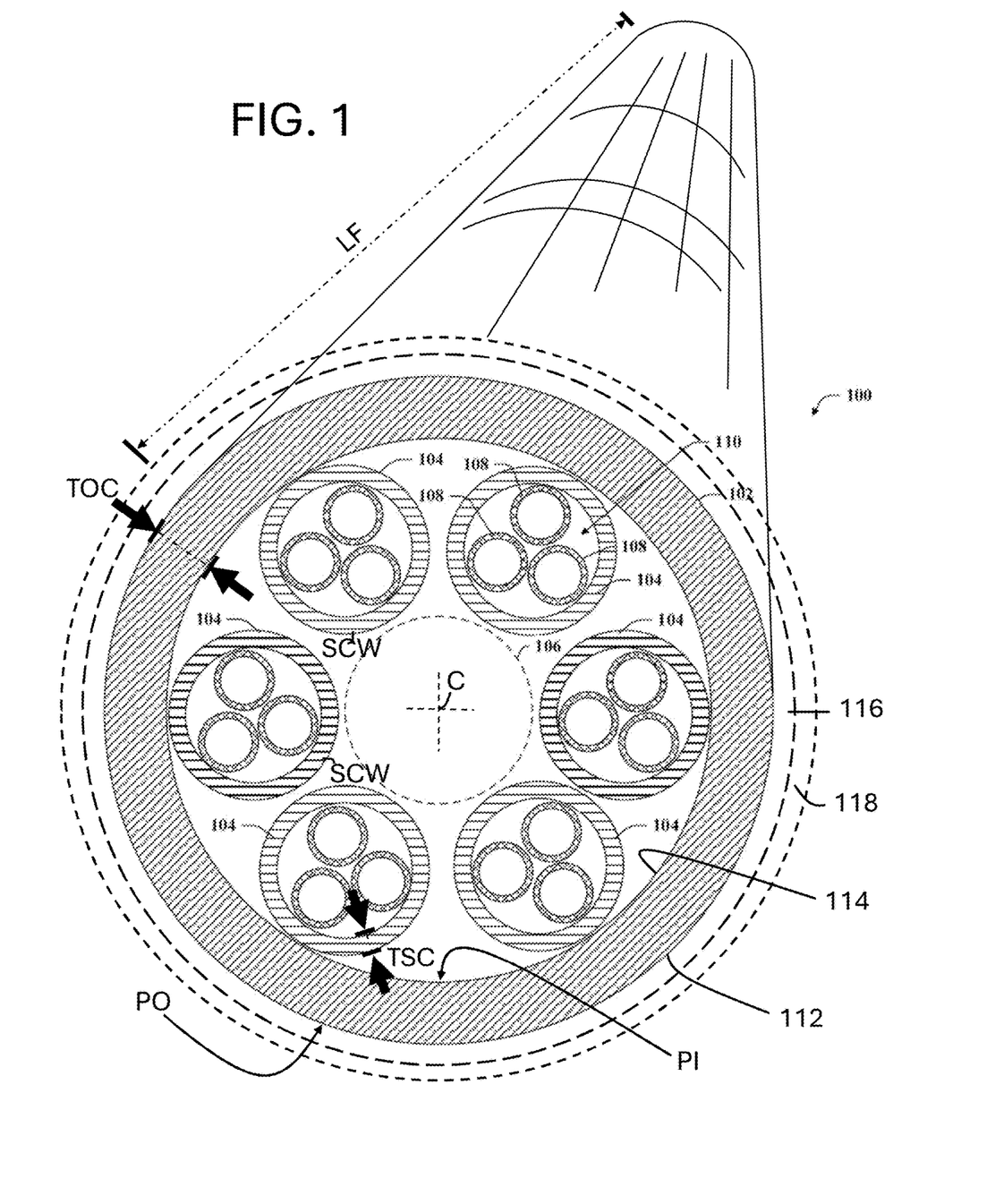
FIG. 1 is a cross-sectional view of an optical fiber according to an aspect of the present disclosure.

Referring now to FIG. 1, a cross-sectional view of an optical fiber 100 is illustrated. According to an aspect, the optical fiber 100 comprises a cladding 102 (e.g., tunnel, channel, passageway, pipe). According to an aspect, the cladding 102 of the optical fiber 100 has an exterior surface 112 and an interior surface 114.

The exterior and interior surfaces 112, 114 of the cladding 102 may be spaced apart from one another by a thickness TOC of material (e.g., glass) of the cladding 102. According to an aspect, the thickness TOC may be less than 300 μm, such as less than 200 μm, less than 150 μm, less than 100 μm, possibly less than 50 μm, and/or greater than 3 μm, such as greater than 5 μm, such as greater than 10 μm, possibly greater than 15 μm, for example.

According to an aspect the thickness TOC may vary around the cladding 102, when viewed in cross-section, such as where at least one portion of the cladding 102 is thicker than another portion. For example, the thicker portion may be thicker than another portion of the cladding 102 by at least 5% relative thereto, such as at least 10%, at least 20%, and/or less than 200%. Variation in thickness TOC may be due to coupling of interior components of the optical fiber 100 to the cladding 102, such as capillary tubes 104. That said, in some designs, the cladding 102 of the optical fiber 100 may have a generally constant thickness TOC between and around perimeters of interior and exterior surfaces 112, 114 of the cladding 102 when viewed in cross-section (see, e.g., FIG. 1), such as within ±20% of a certain thickness (e.g., ±15%, ±10%, ±5%), such as a mean or median thickness TOC, such as where the cladding 102 is largely independent of interior components of the optical fiber 100. Maintaining a generally constant thickness TOC of the cladding 102 of the optical fiber 100 may help control bending of the optical fiber 100 by mitigating bend preference, or difference in bending force to similarly bend a strong or stronger axis of bending relative to a weak or weaker axis.

According to an aspect, the cladding 102 of the optical fiber 100 is round in cross-section, such as circular or oval. Where outer roundness is $4\pi \times$(area within perimeter $P_O$ defined by the outer surface in cross-section)/(perimeter $P_O$ distance)$^2$, the outer roundness of the cladding 102 of the optical fiber 100 may be less than 1 at least is some parts thereof, but close thereto, such as greater than 0.95, such as greater than 0.99. According to an aspect, the optical fiber 100 has a cross-sectional dimension DOF (see FIG. 2) orthogonal to length (e.g., widest cross-sectional dimension, diameter, major axis dimension) that is less than 500 μm, such as less than 300 μm, and/or at least 50 μm, such as at least 100 μm. Smaller cross-sections may facilitate greater flexibility of the optical fiber 100 and/or a corresponding cable. This cross-sectional dimension may correspond with the diameter of a cladding 102 that may be round, and/or with coating(s) 116, 118 overlying such a cladding 102.

Similarly, where inner roundness is $4\pi \times$(area within perimeter $P_I$ defined by the inner surface 114 in cross-section)/(perimeter $P_I$ distance)$^2$, the inner roundness of the cladding 102 of the optical fiber 100 may be less than 1, but close thereto, such as greater than 0.95, such as greater than 0.99. It is contemplated the exterior or interior surfaces 112, 114 of the cladding 102 may be round (i.e. 1.00 and/or 1.00±0.4) in certain cross-sections and less than round (e.g., 0.99) in other cross-sections along a length LF of the optical fiber 100.

According to an aspect, the outer perimeter PO of the cladding 102 is rounder than the inner perimeter $P_I$, such as by at least 0.01, such as by at least 0.04, such as by at least 0.1, and/or no more than 0.8. Maintaining a generally round shape of the cladding 102 of the optical fiber 100 may help control bending of the optical fiber 100 by mitigating bend preference. Non-round geometry of the inner perimeter $P_I$ may facilitate coupling of interior elements within the optical fiber 100. That said, Applicants contemplate that the inner perimeter PI may be as round or rounder than the outer perimeter PO, and both may have a roundness greater than 0.99, such as 1.00 and/or 1.00±0.4.

According to an aspect, the cladding 102 provides protection and/or rigidity to the optical fiber 100. The cladding 102 continuously extends for a long, uninterrupted distance along the length LF of the optical fiber 100, without splicing, whereby structural weaknesses and optical variations are mitigated. According to an aspect, the length LF is at least one meter, such as at least ten meters, such as at least thirty meters, and/or less than one hundred kilometers. The length LF may be measured by separating the optical fiber 100 from a cable and measuring the length LF thereof because, as further explained below, the length LF may not match that of the respective cable due to excess fiber length.

According to an aspect, the cladding 102 may comprise (e.g., consist more than 50% by volume of, >80 vol %, >90 vol %, such as 100%) glass, such as a silicate glass. According to an aspect, glass of the cladding 102 may have at least 30 mol % silica ($SiO_2$) and/or less than 99.9% silica (i.e. is a silicate glass). The glass may further comprise alumina ($Al_2O_3$), such as at least 2 mol % and less than 40 mol %, where the silica and alumina help build a molecular network for the glass. The glass may further include boria ($B_2O_3$), such as at least 2 mol % and less than 40 mol %, which may help lower a liquidus temperature of the glass. The glass may further include titania ($TiO_2$), such as at least 2 mol % and less than 40 mol % for strength and/or optical properties. While oxides provided herein are, by convention, representative of constituents and their respective molar percentages in the glass, the constituents may well be provided to a respective batch melt by more complex compounds as raw materials, such as borax for example. The cladding 102 may comprise or consist of a silica-based glass (e.g., >50 mol % silica). Moreover, the capillary tubes 104 may too comprise or consist of a silica-based glass, such as glass of the same composition. Put another way, each of the capillary tubes 104 may comprise the same or similar material as the cladding 102.

According to an aspect, the glass of the cladding 102 and/or the capillary tubes 104 may be mostly or fully amorphous, for example having less than 0.1 vol % crystallinity or other inclusions, such as less than 0.05 vol %, such as a non-zero and detectable-amount of crystals or other inclusions; and/or a non-zero and detectable-amount amount but less than 1 vol %. Amorphous glass may have flatter surfaces than glass-ceramic for example, which may help with signal propagation through the optical fiber 100 such as by reducing scatter.

According to aspect, the glass of the cladding 102 may have a coefficient of thermal expansion greater than that of fused silica over a temperature range of 100-300° C., whereby the glass may expand (at least to some degree) as the cable heats, such as greater than 0.25 ppm/K on average over 100-300° C., such as greater than 0.5 ppm/K over that temperature range, such as greater than 1 ppm/K, such as greater than 2 ppm/K, and/or less than 25 ppm/K, mitigating heat-induced expansion mismatch with other elements of the cable.

While the optical fiber 100 communicates light, such as for sending of information carried thereby, glass of the optical fiber 100 may not be particularly translucent. According to an aspect, glass of the cladding 102 may be such that the glass transmits (total transmission) less than 99% of light in a range of 400 to 700 nm directed along 1 mm path length through the glass, such as less than 98%, such as less than 95%. Accordingly, glass of the cladding 102 may appear colored (e.g., dark gray, blue, green). Deeper fiber color may help a handler better see the optical fiber 100, such as during connectorization (i.e. process of building the respective optical fiber into an optical connector) for example.

According to an aspect, within the cladding 102, the optical fiber 100 includes capillary tubes 104 (e.g., capillary tubes, sub-conduits). The capillary tubes 104 may be round in cross-section as shown in FIG. 1, or the capillary tubes 104 may be otherwise shaped (e.g., arch-shaped, oval, minor sector shaped i.e. pie-slice shaped). As discussed above, the capillary tubes 104 may be directly or indirectly coupled to and/or partially formed from the interior surface 114 of the cladding 102, such as in a case where a capillary tube in cross-section includes an arch with each leg thereof anchored on the interior surface 114 of the cladding 102. The capillary tubes 104 may be positioned around the inner perimeter $P_I$ of the cladding 102. According to an aspect, the capillary tubes 104 are equally spaced apart from one another along the inner perimeter PI. As shown in FIG. 1, the optical fiber 100 may have more than one of the capillary tubes 104, such as at least three or more (e.g., four, five, six).

According to an aspect, the capillary tubes 104 may comprise glass (e.g., consisting more than 50% by volume of, >80 vol %, >90 vol %, such as 100%) glass, such as a silicate glass of a composition as described above with respect to the cladding 102. Each of the capillary tubes 104 may comprise (e.g., consist more than 50% by volume of, >80 vol %, >90 vol %, such as 100%) or consist of a silica-based glass (e.g., silica doped with fluorine, germanium). According to an aspect, the glass may be mostly or fully amorphous as discussed above. Amorphous glass may have a flatter surfaces, which may directly or indirectly help with signal propagation through the optical fiber 100 such as by mitigating scatter-based attenuation.

According to an aspect, glass of the cladding 102 and glass of the capillary tubes 104 may be formed together by a drawing process to form the optical fiber 100, with the capillary tubes 104 attached to and/or partially forming the interior surface 114 of the cladding 102. As indicated above, glass of the capillary tubes 104 may have the same composition and/or coefficient of thermal expansion and/or modulus of elasticity as the glass of the cladding 102, which may help the optical fiber 100 to maintain relative dimensions and shape during drawing and cooling of the optical fiber 100.

According to an aspect, the capillary tube 104 includes a wall SCW (or walls) thereof. The wall SCW of the capillary tube 104 may have a thickness TSC that is thinner than thickness TOC of the cladding 102, such as where the thickness TSC of at least a portion of the wall SCW is less than half the thickness TOC, such as less than a third, less than a fourth, or may even be less than a fifth the thickness TOC. As such, relative thickness of the cladding 102 compared to the capillary tube 104 and location of the cladding 102, further from a center C (e.g., geometric centroid of cross-section perpendicular to length) of the optical fiber 100 may be such that the cladding 102 largely controls bending performance of the optical fiber 100. That said, the capillary tubes 104 may still impart stronger and weaker axes for bending such that the optical fiber 100 may bend more easily around the weaker axes than the stronger (as further discussed with respect to FIG. 2).

The capillary tubes 104 are each depicted in FIG. 1 in the optical fiber 100 as having a plurality of nested capillaries 108 (e.g., tubes, straws, rods, micro-pipes), where at least one of the nested capillaries 108 is disposed nested within an interior cavity 110 of a respective capillary tube 104. Put another way, according to an aspect, the wall SCW of the capillary tube 104 may surround a space in which is the nested capillary 108. As shown in FIG. 1, the capillary tube 104 may contain more than one such nested capillary 108, such as two, three, four, etc. According to an aspect, the nested capillary 108 may comprise or consist of a silica-based glass, which may be the same as that of the cladding 102 and/or the wall SCW of the capillary tube 104.

The optical fiber 100 depicted in FIG. 1 is shown as having six of the capillary tubes 104, and it is to be appreciated that an optical fiber can have various numbers of capillary tubes 104 (e.g., ≥2, ≥3, ≥4, ≥6, or ≥8 sub-conduits, and/or ≤50, ≤20, ≤10). Furthermore, the optical fiber 100 depicted in FIG. 1 is shown as having nested capillaries 108 in each of the capillary tubes 104, and it is to be appreciated that an optical fiber can have various numbers of nested capillaries disposed within a single capillary tube as shown (e.g., ≥1, ≥2, ≥3, ≥4, or ≥5 straws, and/or ≤50, ≤20, ≤10). It is further to be appreciated that where the optical fiber 100 has a plurality of the nested capillaries 108 within a single capillary tube 104, and nested capillaries 108 within a same capillary tube 104 may be different sizes from one another. Likewise the capillary tubes 104 may vary in size, such as where one such capillary tube 104 may be coupled to the cladding 102 and have a size comparable to the nested capillary 108 of FIG. 1, for example, but distinguished therefrom by not being within a capillary tube 104 for example.

As shown with dashed lines in FIG. 1, the optical fiber 100 may include one or more coating layers 116, 118 on the exterior surface 112 of the cladding 102. These coating layers 116, 118 may be primary- (116) and secondary-coating layers (118). According to an aspect, the coatings layers 116, 118 may be or include, for example, a polymer, such as an ultra-violet-light curable polymer (e.g., acrylate, polyimide, silicone) and may be configured such that the secondary coating layer 118 is harder than the primary coating layer 116. In further embodiments, one or more of the coating layers 116, 118 may be or include a coded or unique colorant, or an additional ink or coating layer, to help facilitate identification of the corresponding optical fiber 100 from among a group of such optical fibers.

Still referring to FIG. 1, according to an aspect, portions of walls SCW of the capillary tubes 104 face one another across the center C of the optical fiber 100 (or other portion of an optical fiber) and also border a hollow core 106 (e.g., passage, hollow passageway) extending through the optical fiber 100. Put another way, in the center C of the optical fiber 100, when viewed in cross-section as shown in FIG. 1, the optical fiber 100 includes the hollow core 106 between the capillary tubes 104 and nested capillaries 108, where the capillary tubes 104 at least partially border and thereby define the hollow core 106.

The hollow core 106 may be used for optical communications, such as where signals conveyed in light pass longitudinally through the hollow core 106 and along the optical fiber 100. Furthermore, the capillary tubes 104 and nested capillaries 108 therein may serve as features of the optical fiber 100 that mitigate resonance of light conveyed through the hollow core 106. While the optical fiber 100 includes the cladding 102, capillary tubes 104, nested capillaries 108, and hollow core 106, other specialized optical fibers or fiber designs may benefit from teachings of the present disclosure. For example, Applicants contemplate that the hollow core 106 may be offset from the center C of an optical fiber, or an optical fiber may have two or more such hollow cores 106.

At least in part because of the above described differences in structure, non-uniformity, composition, geometry, optical fibers as disclosed herein, such as the optical fiber 100 and optical fibers having elements thereof, move and behave different when loaded and stressed. For example, the optical fibers may rotate rather than translate within a cavity, buffer tube, or other surrounding structure. Furthermore, at least in part because of the different signal communication medium (e.g. air, gas, vacuum; in contrast to glass core), losses of signals occur differently. Cables disclosed herein support such optical fibers by including structures, spacing, and selection of components that operate together with such optical fibers to influence signal communication and minimize loss, such as micro- and macro-bend loss.

Figure 2:
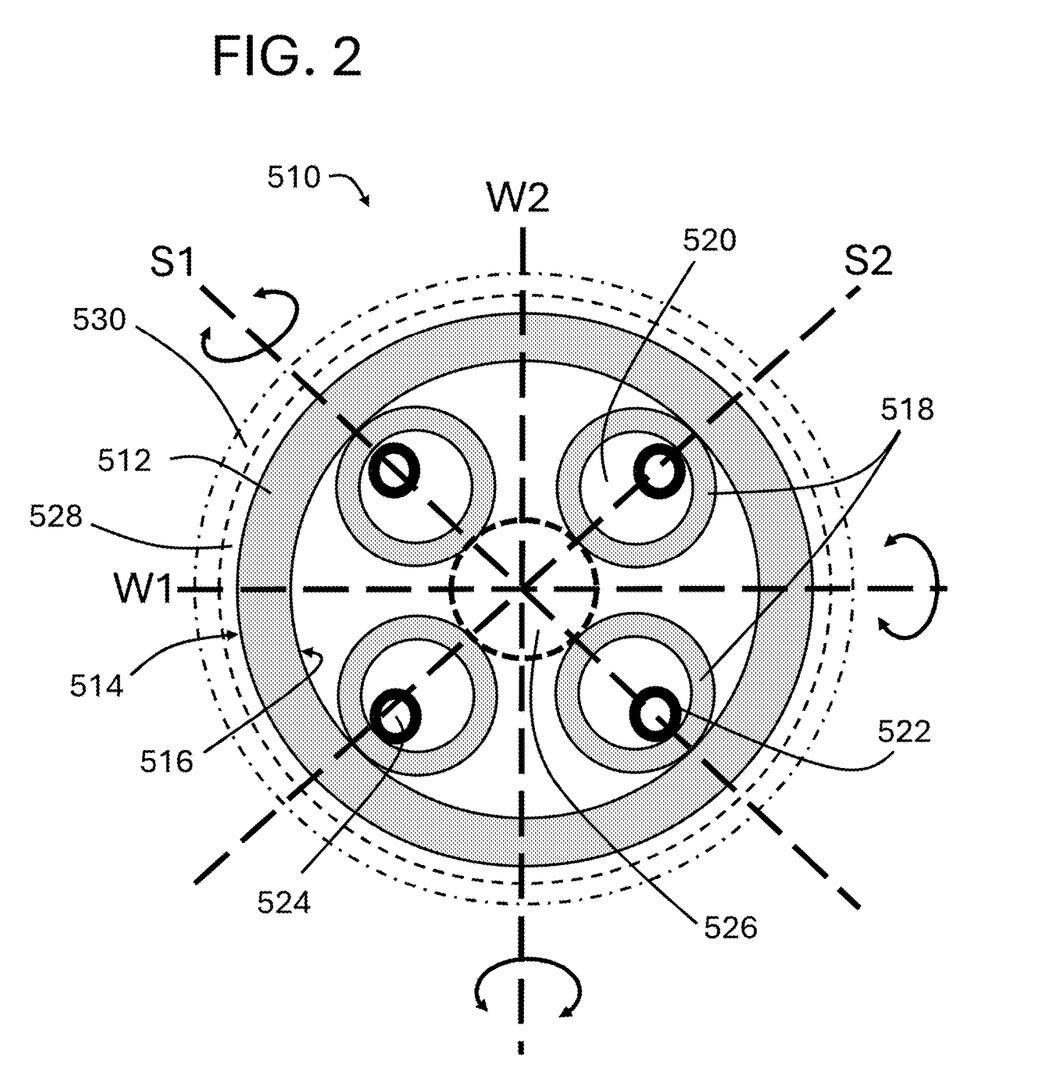
FIG. 2 is a cross-sectional view of an optical fiber according to another aspect of the present disclosure.

Referring to FIG. 2, an optical fiber 510 includes a cladding 512, shown as an annular element with exterior and interior surfaces 514, 516. Interior to the cladding 512, the optical fiber 510 includes capillary tubes 518 attached to the interior surface 516 of the cladding 512 and spaced apart from one another. The capillary tubes 518 include an open conduit 520 extending lengthwise through the interior of the optical fiber. Within the conduit 520 of the capillary tubes 518, the optical fiber 510 includes nested capillaries 522, which themselves include open passages 524. As with the optical fiber 100 of FIG. 1, the optical fiber 510 may include layers 528, 530 of polymeric or organic coatings, ink, and/or inorganic or electrically-conductive coatings.

The cladding 512, capillary tubes 518, and nested capillaries 522 help control signal communication through the optical fiber 510, such as by providing an anti-resonant function for signals passing through a center 526 of the optical fiber 510. Further, the capillary tubes 518 and nested capillaries 522, as well as spaces therebetween, influence bending performance of the optical fiber 510 such that the fiber has weaker axes W1, W2 and stronger axes S1, S2. The stronger axes S1, S2 correspond to axes around which bending of the optical fiber 510 may require more force or loading than around the weaker axes W1, W2, such as where at least one of the capillary tubes 518 is positioned furthest away from the respective axis S1 or S2 and thereby providing a greater moment opposing bending.

Figure 3A:
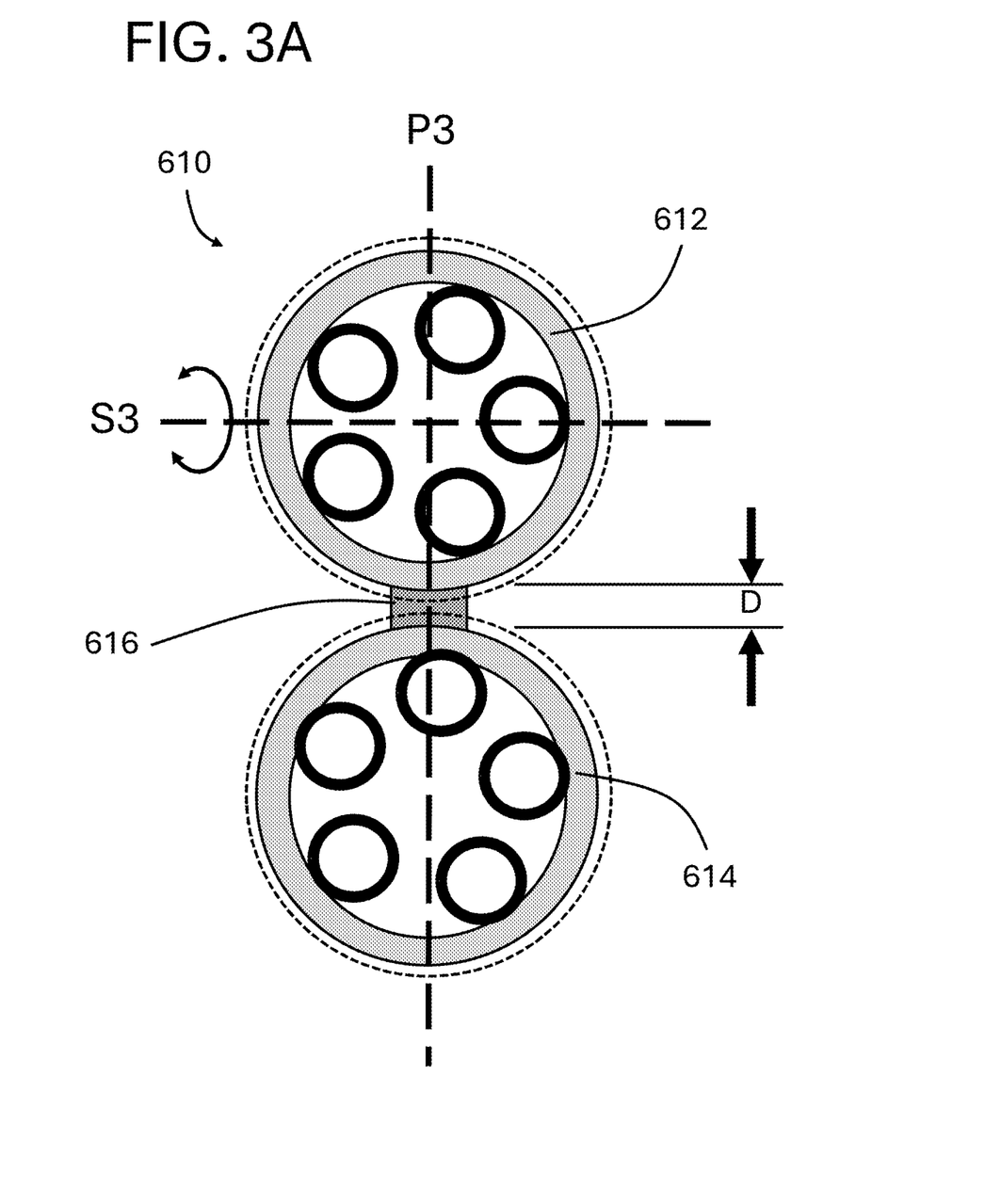
FIGS. 3A and B are cross-sectional views of optical fibers according to an aspect of the present disclosure.

Referring now to FIG. 3A, an assembly 610 includes a first optical fiber 612 bonded to a second optical fiber 614, such as via an adhesive 616 (e.g., resin, ultraviolet-light cured adhesive; e.g., acrylate, fluoroacrylate, polyimide, polybutylene terephthalate, polypropylene, polyethylene). The adhesive 616 may only extend over portion of exteriors of the optical fibers 612, 614, as shown in FIG. 3A, or may fully envelop the optical fibers 612, 614 (in cross-section).

According to an aspect, claddings 618, 620 of the optical fibers 612, 614 are close to one another, such as within a distance D of 3 mm, such as within 2 mm, such as within 1 mm, and/or no less than 5 µm apart, such as no less than 10 µm. With sufficient spacing, adhesive 616 may be flexible enough to allow some independent movement of the optical fibers 612, 614 relative to one another, such as where the first optical fiber 612 rotates relative to the second optical fiber 614 (e.g., by greater than 1°, greater than 4°, and/or no more than 90°), such as when the assembly 610 flexed, stressed, and/or bent. Such independent movement may allow the optical fibers 612, 614 to reorient themselves to lower stress positions in bending for example, and thereby improve signal communication.

The assembly 610 may have a preferred bending axis P3, similar to a weaker axis of the optical fiber 510 for example, where bending of the assembly 610 around the preferred bending axis P3 (positively or negatively according to the "right-hand rule) requires less bending force or moment, compared to (all) other axes of the assembly 610 in that cross section orthogonal to length, such as with bending around the preferred bending axis P3 compared to the stronger axis S3. Weaker bending axes (see, e.g., W1, W2 in FIG. 2) of the optical fibers 612, 614 may align or generally align with the preferred bending axis P3 of the assembly 610, such as for one or all of the optical fibers 612, 614, such as within 15° of the preferred bending axis P3, such as within 10°, so that bending of the assembly 610 and bending of the optical fibers 612, 614 therein may impart less stress and may preserve signal integrity for example.

Figure 3B:
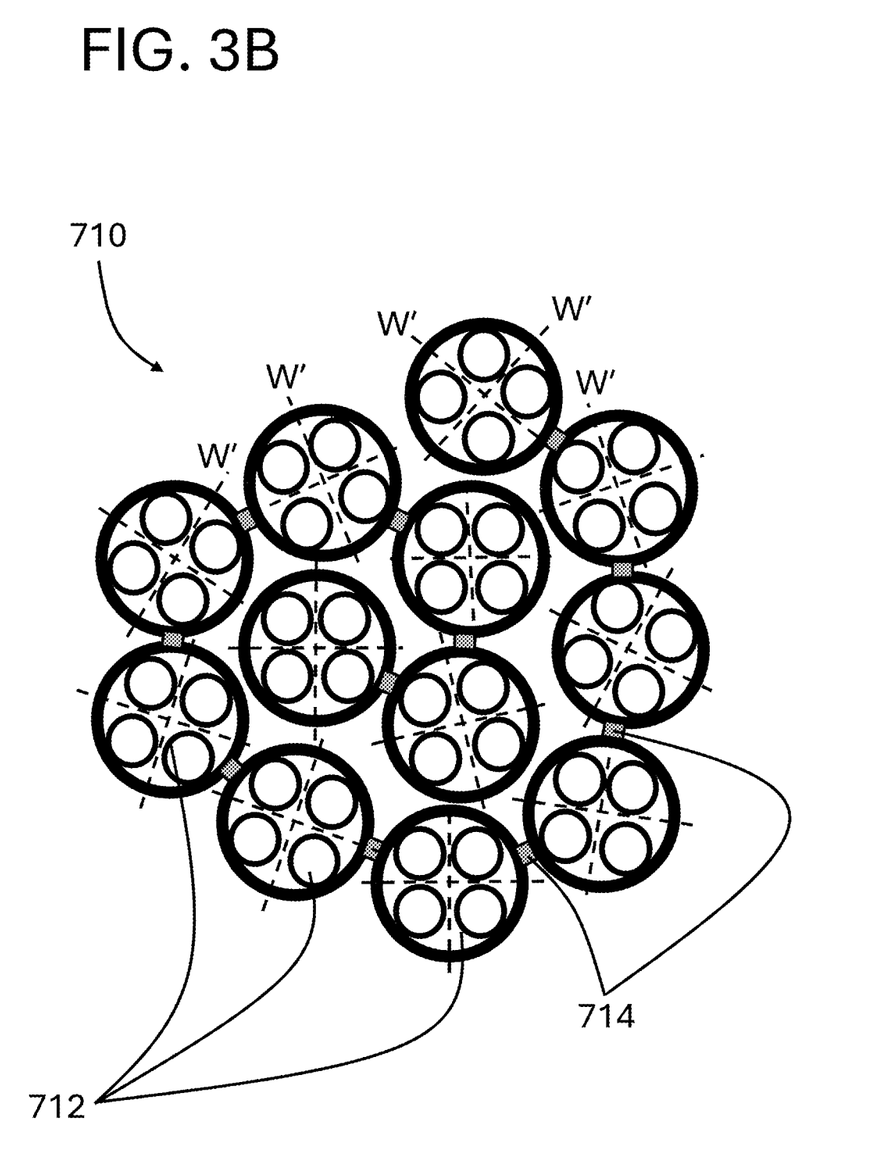

The assembly 610 may further include additional optical fibers, such as 3, 4, 5, 6, or more bonded to one another in a straight line to form a ribbon of optical fibers for example. Referring now to FIG. 3B, an assembly 710 includes optical fibers 712 (a number thereof greater than 2 optical fibers 712, such as >3, >4, >7, >11, >15, and/or <45) coupled to one another by adhesive 714, similar to the assembly 610. The optical fibers 712 are bonded to one another, and the assembly 710 is rolled into a spiral or otherwise arranged into a condensed configuration where the optical fibers 712 are positioned next to one another in a non-linear arrangement when viewed in cross section, as shown in FIG. 3B.

Figure 6:
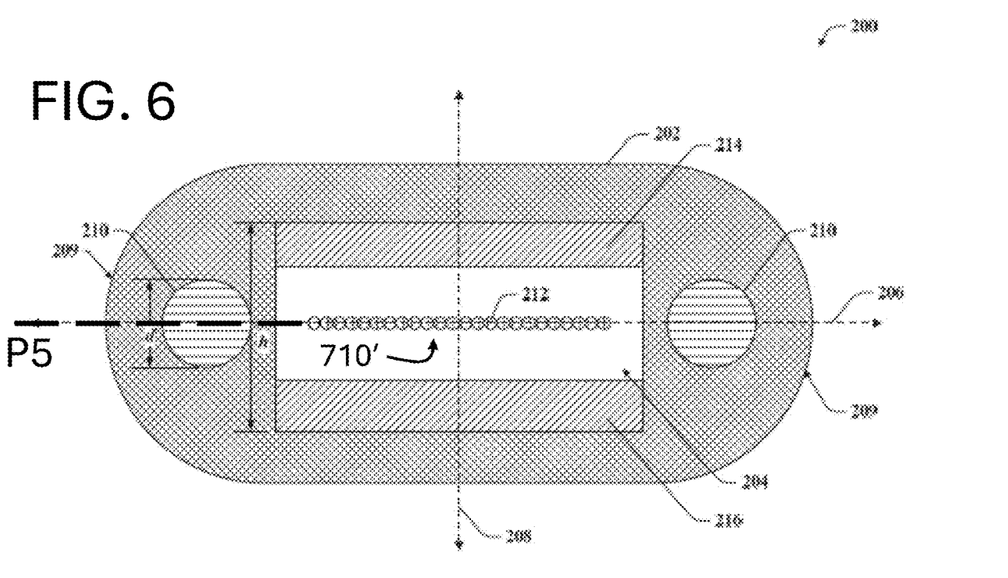
FIG. 6 is a cross-sectional view of yet another optical fiber cable according to an aspect of the present disclosure.

According to an aspect, weaker W' axes (and stronger axes) of the respective optical fibers 712 (see, e.g., W1, W2, S1, S2 in FIG. 2) of the assembly 710 are oriented in different directions from one another, such as with the assembly 710 in the rolled or otherwise condensed configuration and/or with the assembly 710 unrolled and lying flat (see assembly 710' in FIG. 6). Accordingly, arranging the optical fibers 712, which individually have weaker and stronger axes, so that their respective weaker and stronger axes at least partially offset one another in the rolled or otherwise condensed configuration assembly 710 may influence flexibility of the assembly 710 and corresponding optical fiber cable, because the assembly 710 as shown in FIG. 3B or a similar such assembly in a rolled or otherwise condensed configuration may essentially lack bend preference.

That said, according to another aspect, arrangements of optical fibers 712 may impart less stress on individual optical fibers 712 in bending and correspondingly achieve lower signal loss (or greater bending ability without additional loss), when the optical fibers 712 are arranged in a linear manner (see optical fibers 212 of assembly 710' in FIG. 6, arranged as a flat ribbon) in certain optical fiber cable designs, such as those with a bend preference. As further discussed herein, in such an arrangement, assembly 710' may be arranged so that a preferential bending axis P5 thereof aligns with a preferential bending axis (also P5) of the respective optical fiber cable 200, such as is parallel thereto, such as is collinear therewith, as shown in FIG. 6.

Accordingly, individual optical fibers 712, 212 of such an assembly 710, 710' may be commonly oriented within the assembly 710, 710'. For example, with the respective assembly lying flat (as shown in FIG. 6, and in contrast to the arrangement of FIG. 3B), capillary tubes (see capillary tubes 518 in FIG. 2) within the at least some of the optical fibers 712, 212 may have generally common orientations, where lines extending between centers of two or more respective optical fibers through centers of similarly oriented capillary tubes of the respective optical fibers are oriented within 100 of one another, such as within 5°, such as within 2°. The assembly 710, 710' may have at least two such commonly-oriented optical fibers, such as at least 2 out of 12, at least 2 out of 8, at least 2 out of 16, at least 2 out of 2 optical fibers, depending upon the size of the assembly 710, 710', such as at least 3, at least 6, at least half, more than half, all of the optical fibers of the respective assembly 710, 710'. According to an aspect, the two or more commonly-oriented optical fibers 712, 212 adjoin one another, such as are side-by-side, or side-by-side-by-side, etc.

According to an aspect, the two or more commonly-oriented optical fibers 712, 212 are oriented with weak axes thereof (see W1, W2 of FIG. 2) generally aligned with (e.g., within 10° of, within 5°, within 2°) a preferential bend axis P5 of the respective assembly 710, 710'. Such an arrangement may facilitate low-stress bending of the optical fibers 712, 212 when the assembly bends around the preferential bend axis P5 thereof, and may accordingly facilitate signal communication therein. However, beyond individual optical fiber orientation and assembly orientation, optical fiber cables disclosed herein have structural features (passage size, location, bend preference) as well as optical fiber lengths relative to the optical fiber cables and work with the optical fiber orientation and assembly orientation to improve optical fiber cable performance, as disclosed herein.

Figure 4:
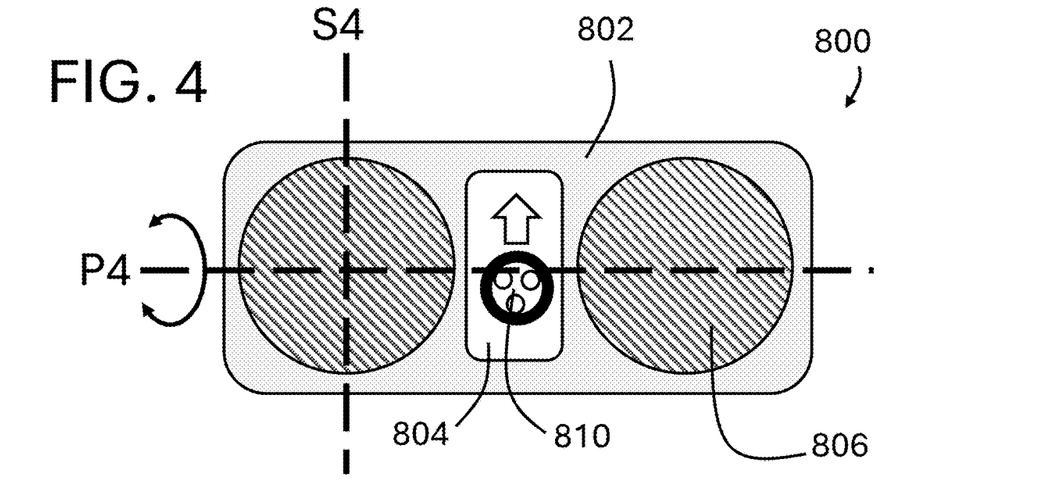
FIG. 4 is a cross-sectional view of an optical fiber cable according to an aspect of the present disclosure.

Referring now to FIG. 4, an optical fiber cable 800 is illustrated in cross-section. The cable 800 includes a cable jacket 802, which surrounds a communication element of the cable 800, such as an optical fiber 810, which may correspond to the optical fiber 100 of FIG. 1. The cable 800 is of a configuration that may be particularly useful for hollow-core optical fibers, when parts of the cable 800 are arranged as disclosed herein. That said, dimensions of parts and relationships therebetween of the cable 800 shown in FIG. 4 may not be to scale in FIG. 4 (or in other figures herein).

According to an aspect of the present disclosure, for example, optical fiber 810 of the cable 800 may be positioned relatively closer to a center of the cable 800 than shown, such as when the cable is stretched longitudinally (e.g., at 50° C., with polymer of the cable jacket 802 in an expanded state; or when the cable 8000 is tensioned under its own weight, such as between telephone poles). As such, available space for movement of the optical fiber 810 compensates for glass of the optical fiber(s) having greater modulus of elasticity (e.g., much greater; $\geq \times 50$, $\geq \times 100$ on average over elastic range of the glass; e.g., 70 GPa for the glass versus 0.1 GPa for the polymer) and lower coefficient of thermal expansion (e.g., much lower; $\leq \times (1/5)$, $\leq \times (1/10)$ on average over the temperature range of 0-300° C.; e.g., 9E-6/° C. for the glass versus 160E-6/° C. for polymer) than polymer of the cable jacket 802 or other parts of the cable 800.

According to an aspect of the present disclosure, as shown in FIG. 4, the cable jacket 802 may surround and accordingly define an interior cavity 804 of the cable 800. The cable jacket 802 may have a polygonal (e.g., rectangular), oblong or obround, dog-bone/dumbbell, or circular outside profile in cross-section, and the cable 800 may have a bend preference, as described above. For cables with a thin cable jacket 802, the shape of the cable jacket 802 in cross-section may also largely be a function of adjoining interior components of the cable 800, such as having bulges corresponding to underlying strength members 806.

According to an aspect, the cable jacket 802 comprises a polymer that may be resistant to abrasion and corrosion, as well as water resistant. According to an aspect, for a polymer-based cable jacket 802, such as comprising (e.g., consisting more than 50% by volume of, >80 vol %, >90 vol %, such as 100%) polyethylene or polyvinyl chloride. In some instances, the cable jacket 802 may be made with flame retardant materials, or low-smoke-zero-halogen materials. According to an aspect, the cable jacket 802 is extruded over parts therein, including the communication element.

Referring to FIG. 4, the cable 800 further comprises the optical fiber 810, positioned within the interior cavity 804 within the cable jacket 802. According to an aspect, the interior cavity 804 loosely surrounds and holds the optical fiber 510. Further, the interior cavity 804 may loosely surround a plurality of optical fibers 510, such as where the optical fibers 510 contact other optical fibers in the interior cavity 804, and have space to move relative to one another in the interior cavity 804. The space and freedom may allow the optical fibers 810 to position themselves in low-stress orientations within the interior cavity 804, within the cable 800, where some or each of the optical fibers 810 may be so-called hollow-core fibers and have attributes described herein (e.g., fragile nature, sensitivity to attenuation) such as with respect to optical fiber 100.

Figure 5:
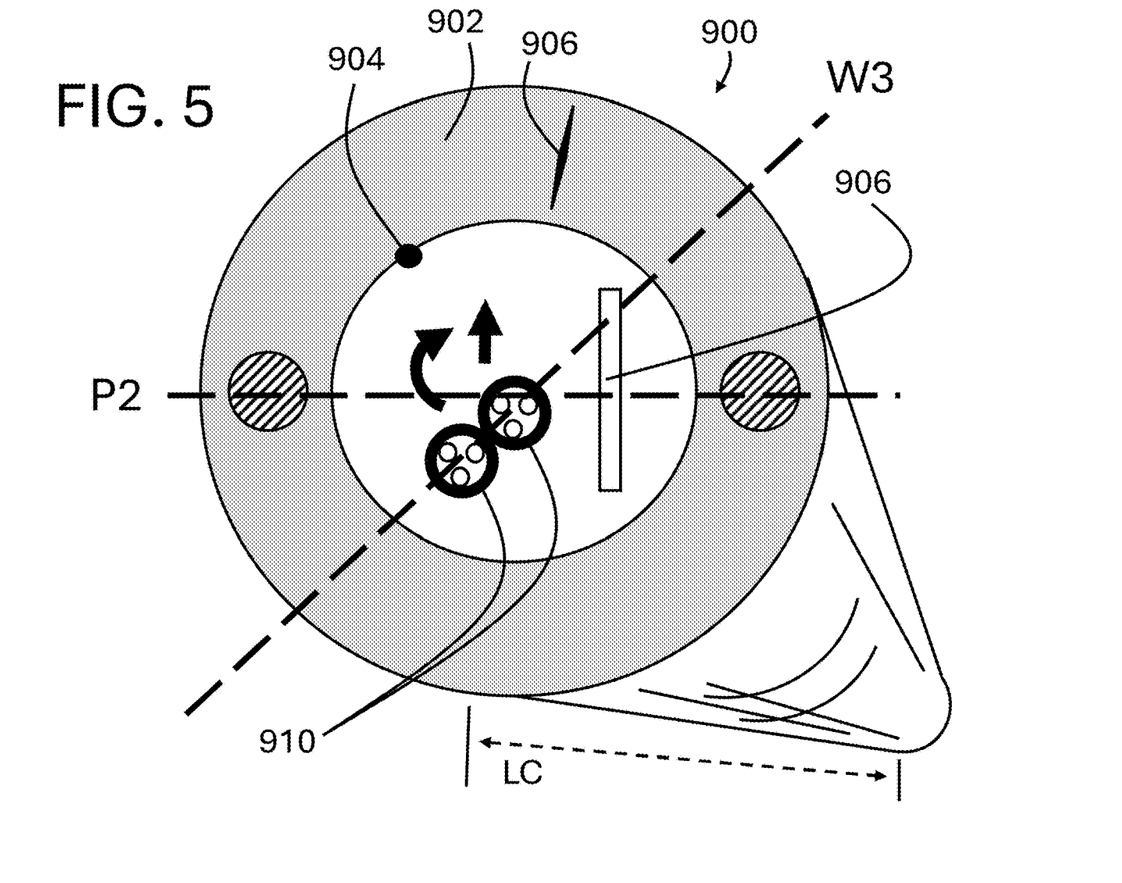
FIG. 5 is a cross-sectional view of another optical fiber cable according to an aspect of the present disclosure.

Referring to FIG. 5, a cable 900 in FIG. 3 represents another design that may use technology disclosed herein to advantageously support specialized optical fibers 910 as disclosed herein, such as the optical fiber 100 of FIG. 1. As with other optical fiber cables disclosed herein such as the cable 800 of FIG. 4, the cable 900 shown in FIG. 5 may not be drawn to scale or show dimensions or geometric relationships disclosed herein, but features and elements of the cable 900, as now further explained, may be present with technology disclosed herein.

According to an aspect, the cable 900 includes a cable jacket 902 of materials and thicknesses disclosed above, similar to the cable jacket 802. Just beneath the cable jacket 902, the cable 900 includes a ripcord 904, which may be used to facilitate opening the cable jacket 902 to access contents therein, such as optical fibers 910. Such a cable jacket 902 may alternatively or further include embedded discontinuities of material 906 (so-called 'fast-access features'), which may facilitate tearing open the cable jacket 902 to access contents therein, such as in place of the ripcord 904 or in addition thereto.

Beneath the cable jacket 902, the cable 900 of FIG. 5 includes water-swellable tape 908, which may carry super-absorbent polymer configured to expand if water enters the cable jacket 902 to thereby help block flow of water along the cable 900. While the cable 900 may be made entirely of dielectric materials (e.g., plastic, fabric, and glass), other cables that use technology disclosed herein may be armored, such as with a spirally-wrapped, corrugated, or otherwise arranged metallic layer adjoining the cable jacket 902, interior thereto, which may help prevent puncture or crushing of the respective cable 900.

Referring to FIG. 5, an optical fiber 910 may have the length LF (see, e.g., optical fiber 100 of FIG. 1) and may be disposed within an optical fiber cable 900 (FIG. 5; see also cable 800 of FIG. 4, cable 200 of FIG. 6, and cable 300 of FIG. 7), which itself may have a length LC that is less than LF, where the optical fiber 910 within the cable 900 may exhibit bending, even when the cable 900 is positioned in a substantially straight, unstretched manner. As used herein, the amount by which the length LF of the optical fiber 910 exceeds the length LC of the cable 900 in which the optical fiber 910 is disposed, is referred to as "excess fiber length" or EFL, which may be expressed as a percentage of the length LC of the respective cable.

EFL may be beneficial. For example, EFL of an optical fiber can allow the corresponding cable to stretch (up to the amount of EFL) without the optical fiber being strained. However, surprisingly, EFL is in the cable 900 of FIG. 5 and other cables disclosed herein may be less than 3%, less than 2%, or even 1% of the cable length LC, such as less than 0.5%, less than 0.3%, less than 0.25%, less than 0.2%, less than 0.1% and/or greater than or equal to zero. Applicants believe the low levels of EFL may help to control bending of the optical fiber 910 within the cable when the cable is not stretched, so that the optical fiber bends less than a radius of less than 200 mm, for example.

Referring now to FIG. 6, an exemplary optical fiber cable 200 is illustrated, wherein the optical fiber cable 200 is configured to mitigate the potential for optical signal attenuation due to stresses on a hollow-core fiber. In particular, the optical fiber cable 200 is configured to include one or more hollow-core fibers having a low or zero EFL.

Accordingly, the optical fiber cable 200 is designed to ensure that a hollow-core fiber disposed therein maintains a minimum radius of curvature that is greater than 200 mm. The optical fiber cable 200 comprises a cable jacket 202 having an interior cavity 204 disposed therein. The cable jacket 202 is formed in a shape that has a major axis 206 and a minor axis 208, such that in exterior profile the cable jacket 202 is wider than it is tall. In exemplary embodiments, the cable jacket 202 is formed as a rectangle with curved ends 209 disposed on opposite sides of the interior cavity 204 along the major axis 206. The cavity 204 can be rectangular in shape, with a major axis of the cavity 204 aligned along the major axis 206 of the cable 200.

The optical fiber cable 200 further comprises a plurality of optical fibers 212. The plurality of optical fibers 212 includes at least one hollow-core fiber. In exemplary embodiments, each of the plurality of optical fibers 212 can be a hollow-core fiber, or the plurality of optical fibers 212 can include a mix of hollow-core fibers and solid-core fibers. As used herein, the term "solid-core fiber" is intended to include not only single-core single-mode optical fiber. but multimode optical fiber, multi-core optical fiber, and substantially any other optical fiber for which a solid is the medium of transmission of an optical signal from one end of the optical fiber to the other.

In exemplary embodiments, the optical fibers 212 are configured as a rigid, planar ribbon of optical fibers. By way of example, the optical fibers 212 can be encapsulated in a cured matrix material that is configured to maintain a planar configuration of the optical fibers 212 when the optical fibers 212 are subjected to stresses. In various embodiments, the optical fibers 212 can be configured as a rigid, planar ribbon that comprises a plurality of ribbon matrix layers. In such embodiments, each of the ribbon matrix layers can have different physical properties such as hardness or elastic modulus, thereby providing protection from different kinds of stresses, impacts, or the like. In some embodiments, the optical fibers 212 can be encapsulated in an extruded polymer material to form the rigid, planar ribbon.

In embodiments where the optical fibers 212 are configured in a rigid, planar ribbon, the ribbon can have any of various fiber counts such as, but not limited to, 8, 12, 16, 24, 32, 36, or 48 fibers. The ribbon has a height of one fiber (plus 2× resin). In some embodiments, the optical fibers 212 of the cable 200 can be arranged in a plurality of such ribbons that are then arranged on top of one another, thereby forming a ribbon stack. In general, a wider ribbon yields a shorter ribbon stack for a same number of the optical fibers 212. Thus, it may be desirable to employ wide ribbons in the optical fiber cable 200 to maintain a small distance between the optical fibers 212 and a neutral bending axis of the cable 200, which typically yields less attenuation than when the optical fibers 212 are positioned further away from the neutral axis. While the cable 200 in FIG. 6 is shown with a flat ribbon, in any of the cables disclosed herein, such as cables 200, 300, the optical fiber or fibers 212 may be loose fibers or intermittently-bonded, non-planar ribbons.

The optical fiber cable 200 further comprises strength elements 210 that are disposed on opposite sides of the cavity 204 along the major axis 206. The strength elements 210 extend along a length of the cable 200 (i.e., looking into the page in FIG. 6). In various exemplary embodiments, the strength elements 210 can be glass-reinforced plastic elements (GRPs), aramid-reinforced plastic elements (ARPs), steel wires, etc. Furthermore, while the optical fiber cable 200 is illustrated with two strength elements 210, it is to be appreciated that each of the depicted strength elements 210 can instead comprise a plurality of strength elements. The strength elements 210 provide tensile strength to the cable 200, but also resist thermal contraction of the cable jacket 202 at low temperature that can otherwise cause an increase in the EFL of the fibers 212.

In the aspect depicted in FIG. 6, a height, h, of the cavity 204 along the minor axis 208 is greater than a diameter, d, of the strength elements 210. Setting h to be greater than d can facilitate access to the fibers 212 by an installer of the cable 200 in the field. For instance, the installer can align a tool with one or more of the strength elements 210. However, it is to be appreciated that in other embodiments, the height h of the cavity 204 can be selected to be less than the diameter d of the strength elements 210. In these embodiments, the strength elements 210 can prevent stresses that are applied to the cable 200 during installation from being transmitted to the cavity 204 and a hollow-core fiber in the optical fibers 212. The optical fiber cable 200 is depicted as including foam layers 214, 216 within the cavity 204. In exemplary embodiments, the foam layers 214, 216 are disposed on opposite sides of the cavity 204 along the minor axis 208 such that the optical fibers 212 are disposed between the foam layers 214, 216. The foam layers 214, 216 can provide additional cushioning for the optical fibers 212 during bending of the cable 200. In various embodiments, the foam layers 214, 216 can have a water-blocking material disposed thereon/therein (e.g., SAP powder).

Figure 7:
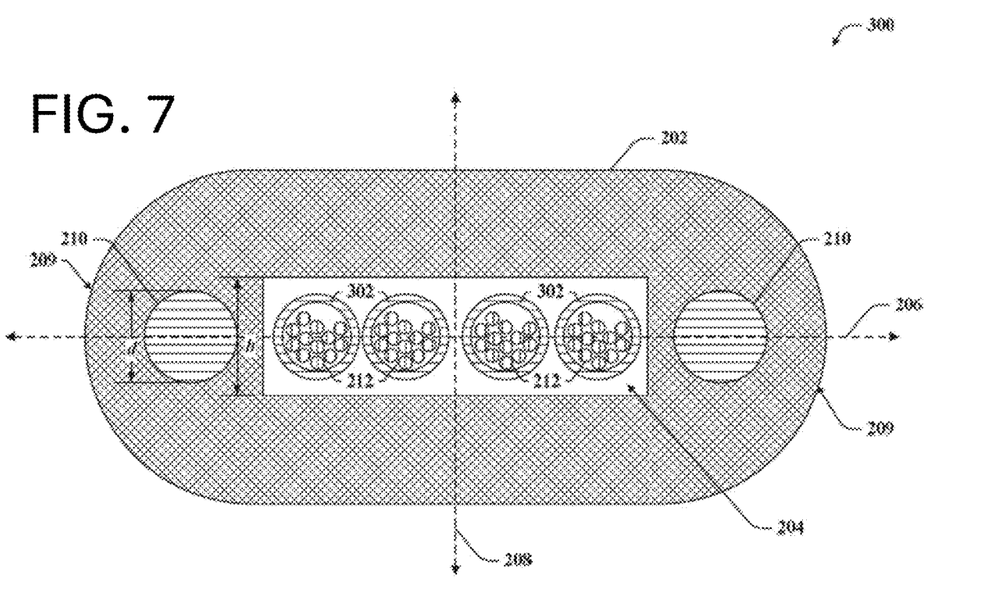
FIG. 7 is a cross-sectional view of still another optical fiber cable according to an aspect of the present disclosure.

In some embodiments, an optical fiber cable can include buffer tubes. Referring now to FIG. 7, another exemplary optical fiber cable 300 is illustrated in which a hollow-core fiber is disposed within a buffer tube. The optical fiber cable 300 is similar in construction to the optical fiber cable 200 and includes the cable jacket 202 having the cavity 204 formed therein with a major axis 206 and minor axis 208 such that the cable jacket 202 is wider than it is tall. The cable 300 further includes the strength elements 210 and the optical fibers 212, including one or more hollow-core fibers.

The cable 300 further comprises one or more buffer tubes 302 disposed within the cavity 204. Each of the buffer tubes 302 has one or more of the optical fibers 212 disposed therein. The buffer tubes 302 can be formed of various extrudable polymers such as polyethylene (PE) or polypropylene (PP). In exemplary embodiments, the buffer tubes 302 can be a two-layer construction wherein a first layer comprises polycarbonate and a second layer comprises polybutylene terephthalate (PBT). Such two-layer construction can provide additional mechanical protection for the hollow-core fibers in the optical fibers 212 beyond that provided by PE or PP buffer tubes 302.

According to an aspect, a widest cross-sectional dimension DBT (e.g., diameter unflattened) of the buffer tube 302 is at least 0.5 mm (e.g., for tight buffer), such as at least 2 mm (e.g., for loose tube), and/or no more than 1 cm, such as less than 7 mm, such as less than 5 mm. According to an aspect, the buffer tube 302 is extruded over parts therein, such as the optical fiber 212 (or optical fibers, such as 1, 3, 6, 9, or 12 optical fibers) and a means for blocking water, such as water-swellable powder (e.g., grains of superabsorbent polymers, such as cross-linked polyacrylates and/or polyacrylamides), water-swellable yarn, and/or gel or grease, for example; or for tight buffers, just the optical fiber 212. Gel or grease may impart less micro-bend stress on the optical fiber 212 than powder for example, however powder and yarn may be less messy to handle when accessing the optical fiber 212. That said, some optical fiber 212 may be fully functional in "dry" buffer tubes, such as those with super absorbent polymer particles (both the standard type and the Kalahari round type), where the polymer in powder form may be at least partially bonded to interior walls of the respective buffer tubes 302. Optical fibers 212 in a buffer tube 302 may differ from one another by color and/or marking (e.g., repeating symbols, patterned colors), and/or structure (e.g., solid-core fibers, multi-core fibers, hollow-core fibers, single-mode, and/or multi-mode). Similarly, the buffer tubes 302 themselves may differ from one another by color and/or marking and/or structure (e.g., diameter, wall thickness, cross-sectional geometry).

The buffer tube 302 helps protect and isolate the optical fiber 212 from forces applied to the cable 300 and from interaction with other elements within the cable 300, such as the strength member 508 for example. For example, the cable 500 may stretch or compress, and the optical fibers 510 may move to low stress positions within the respective buffer tubes 506. However, thickness TBT and material of the buffer tube 506 influences bending characteristics thereof, and the buffer tube 506 may further benefit from flexing and shifting within the cable jacket 502, as the cable 500 is bent or otherwise deformed to allow movement of the optical fibers 510 to low-stress positions. According to an aspect, wall thickness TBT of the buffer tube 506 is greater than 40 μm, such as greater than 80 μm, and/or less than 500 μm. Other thicknesses TBT are contemplated, such as less than 40 μm for a thin-walled buffer tube, or greater than 500 μm, such as for thick tight buffer.

EXAMPLE

Figure 8:
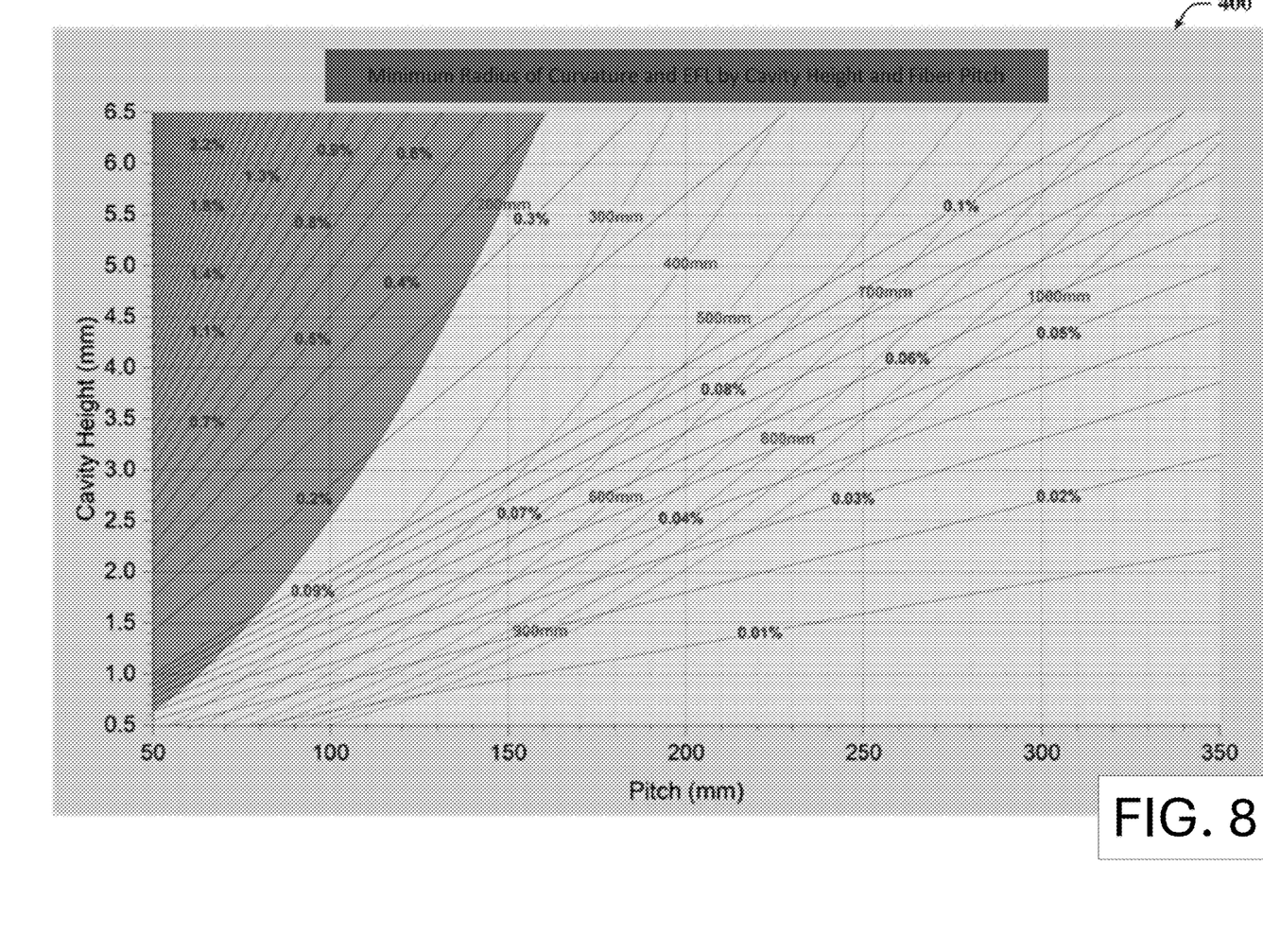
FIG. 8 is a plot illustrating relationships between cable cavity height and optical fiber pitch therein for different percentages of excess fiber length according to an aspect of the present disclosure.

Applicants find that in a cable comprising elements of the optical cables 200, 300, the EFL of the optical fibers 212 and the height h of the cavity 204 are factors influence a minimum radius of curvature for a hollow-core optical fiber. Furthermore, Applicants conducted a theoretical analysis of the design of optical fiber cable 200 depicted in FIG. 6, and established relationships among EFL of the fibers 212, height h of the cavity 204, and minimum radius of curvature of the fibers 212. Referring now to FIG. 8, a plot 400 depicts results of this analysis.

Still referring to FIG. 8, along the x-axis of the plot 400 is the bending pitch of the optical fibers 212 in millimeters, where the bending pitch refers to the period of sinusoidal bending of the optical fibers 212 due to EFL of the fibers 212 within the cavity 204 (or passage). Along the y-axis of the plot 400 is the height h of the cavity 204. The lines along the plot 400 indicate the relationship between cavity height and pitch for various levels of EFL. In other words, the lines of plot 400 indicate a bending pitch to which the fibers 212 are subjected for various heights of the cavity 204. The non-linear/arcing curves along the plot 400 indicate the relationship among minimum radius of curvature of the fibers 212, the cavity height, and the pitch. In other words, for each curve, points above the curve indicate combinations of cavity height and pitch that will cause the optical fibers 212 to experience a radius of curvature below the minimum radius of curvature specified for such curve. The plot 400 assumes that the cable 200 is straight (i.e. lying flat, untensioned) at a temperature of 20° C.

The shaded region to the left in the plot 400 corresponds to combinations of cavity height and bending pitch that cause the optical fibers 212 to experience a radius of curvature below 200 mm (i.e. a tighter bend). As can be observed from the plot 400, as EFL exceeds about 0.2%, a minimum cavity height to maintain a fiber radius of curvature below 200 mm rapidly increases. Accordingly, in various embodiments, an optical fiber cable (e.g., the cables 200, 300) that incorporates a hollow-core fiber has an EFL of less than or equal to 0.5%, such as less than 0.3%, such as less than 0.2%. In exemplary embodiments, the optical fiber cable 200 can be configured to have an EFL of less than or equal to 0.1%, such as when the height h of the cavity 204 is less than or equal to 1.75 mm. In further exemplary embodiments, the optical fiber cable 200 can be configured to have a cavity height of greater than or equal to 3.25 mm, so that the optical fibers 212 may not experience a minimum radius of curvature less than 200 mm at 0.2% EFL.

According to an Aspect A1, an optical fiber cable comprises a jacket (see, e.g., jackets 802, 902 of FIGS. 4-5) comprising a polymer. The jacket at least partially surrounds a passage (see, e.g., cavity 804 of FIG. 4) extending lengthwise therethrough a distance of at least 10 meters, such as at least 20 m, such as at least 50 m, where the passage has open space therein that may be continuously open through jacket along the distance. The cable further comprises strength members (see, e.g., strength members 806 of cable 800 in FIG. 4) coupled to the jacket, such as physically connected to, surrounded by, encapsulated within, or otherwise coupled, where the strength members have an elastic modulus greater than the polymer of the jacket and the strength members bear tensile loading of the optical fiber cable, reinforcing the jacket and other parts of the cable for example. The cable still further comprises an optical fiber (see, e.g., optical fiber 810 of FIG. 4; see also optical fiber 100 of FIG. 1 as well as elements thereof) positioned in the passage. The optical fiber comprises a cladding surrounding capillary tubes. Surfaces of at least some of the capillary tubes surround a hollow core of the optical fiber, which is configured to guide optical signals transmitted therealong. The cladding of the optical fiber has interior and exterior surfaces, where a cross-section of cladding taken orthogonal to length of the optical fiber has a perimeter corresponding to the exterior surface. Area of the cross-section within the perimeter may be greater than 50 μm$^2$ and less than 1 mm$^2$, or may alternatively be lesser than 50 μm$^2$ or greater than 1 mm$^2$ (or alternatively greater than 10 μm$^2$, greater than 20 μm$^2$, greater than 80 μm$^2$, greater than 100 μm$^2$, and/or less than 10 mm$^2$, less than 5 mm$^2$, less than 2 mm$^2$, less than 0.8 mm$^2$). The cable comprises a preferential bend axis around which bending of the optical fiber cable requires less force to accomplish than another axis of the optical fiber cable. At least two of the strength members are positioned along the preferential bend axis of the optical fiber cable. The optical fiber comprises a stronger axis and a weaker axis such that loading to bend the optical fiber around the stronger axis is greater than that to bend the optical fiber around the weaker axis. The open space of the passage has a cross-sectional area greater than ten times that of the cladding of the optical fiber, where the optical fiber is at least partially free to move around in the open space. Accordingly, as the optical fiber cable bends the optical fiber cable is configured to facilitate reorientation of the optical fiber within the passage to a lower-stress position and/or orientation relative to another higher-stress position and/or orientation, and to thereby mitigate loss of signals communicated by the optical fiber.

According to an Aspect A2, with the optical fiber cable of Aspect A1, when the optical fiber cable bends to a radius of 200 mm around the preferential bend axis, the optical fiber at least partially rotates within the passage such that the weaker axis of the optical fiber moves closer to alignment with the preferential bend axis of the optical fiber cable, such as by at least 0.2 degrees, such as at least 0.5 degrees, such as at least 1 degree, and or no more than 120 degrees.

According to an Aspect A3, with the optical fiber cable of Aspect A1 or A2, the passage has a height orthogonal to length of the optical fiber cable, where the height is at least 1 mm and no more than 6.5 mm.

According to an Aspect A4, with the optical fiber cable of any one of Aspects A1 to A3, when the optical fiber cable bends to a radius of 200 mm around the preferential bend axis, the optical fiber moves (i.e. translates) within the passage toward a neutral axis of the optical fiber cable, such as by at least 10 microns, at least 50 microns, and/or no more than 5 mm.

According to an Aspect A5, with the optical fiber cable of any one of Aspects A1 to A4, the capillary tubes of the optical fiber are connected to the interior surface of the cladding and spaced apart from one another around the interior surface thereof. Further, the stronger axis of the optical fiber passes through the exterior surface of the cladding, a center of the optical fiber (in cross-section), at least one of the capillary tubes, such as two capillary tubes, and again through the exterior surface of the cladding.

According to an Aspect A6, with the optical fiber cable of any one of Aspects A1 to A5, when the optical fiber cable bends to a radius of 200 mm around the preferential bend axis, the passage overlays the neutral axis of the optical fiber cable.

According to an Aspect A7, with the optical fiber cable of any one of Aspects A1 to A6, in a 10-meter-long section of the optical fiber cable lying straight and flat, at 20° C. and not under tension, the optical fiber in the passage thereof has a length greater than or equal to 10 meters and less than 10.05 meters.

According to an Aspect A8, with the optical fiber cable of Aspect A7, in the 10-meter-long section, the optical fiber has a length less than 10.02 meters.

According to an Aspect A9, with the optical fiber cable of any one of Aspects A1 to A8, the optical fiber is a first optical fiber and the optical fiber cable further comprising a second optical fiber. The second optical fiber comprises a cladding, capillary tubes, and a hollow core configured to guide optical signals transmitted along the second optical fiber. The first and second optical fibers are at least partially bonded to one another. A preferential bending axis of the first and second optical fibers bonded to one another extends from the cladding of the first optical fiber, through the hollow core of the first optical fiber, again through the cladding of the first optical fiber, through the bond between the first and second optical fibers, through the cladding of the second optical fiber, through the hollow core of the second optical fiber, and again through the cladding of the second optical fiber.

According to an Aspect A10, with the optical fiber cable of Aspect A9, when the optical fiber cable bends to a radius of 200 mm around the preferential bending axis thereof, the first and second optical fibers at least partially rotate within the passage such that the preferential bending axis of the first and second optical fibers moves closer into alignment with the preferential bend axis of the optical fiber cable, such as by at least 0.2 degrees, such as at least 0.5 degrees, such as at least 1 degree, and or no more than 120 degrees.

According to an Aspect A11, with the optical fiber cable of Aspect A9 or A10, when the optical fiber cable bends to a radius of 200 mm around the preferential bend axis thereof, the first and second optical fibers move (i.e. translate) within the passage toward a neutral axis of the optical fiber cable, such as by at least 10 microns, at least 50 microns, and/or no more than 10 mm.

According to an Aspect B1, an optical fiber cable comprises a jacket comprising a polymer. The jacket at least partially surrounds a passage extending lengthwise therethrough a distance of at least 10 meters, and the passage has open space therein. The cable comprises strength members coupled to the jacket, where the strength members have an elastic modulus greater than the polymer of the jacket. The cable comprises an optical fiber positioned in the passage. The optical fiber comprises a cladding surrounding capillary tubes. Surfaces of at least some of the capillary tubes surround a hollow core of the optical fiber, where the hollow core is configured to guide optical signals transmitted therealong. The cladding of the optical fiber has interior and exterior surfaces, where a cross-section of cladding taken orthogonal to length of the optical fiber has a perimeter corresponding to the exterior surface. Area of the cross-section within the perimeter is greater than 50 $\mu m^2$ and less than 1 $mm^2$. The cable comprises a preferential bend axis around which bending of the optical fiber cable requires less force to accomplish than another axis of the optical fiber cable. The optical fiber comprises a stronger axis and a weaker axis such that loading to bend the optical fiber around the stronger axis is greater than that to bend the optical fiber around the weaker axis. The open space of the passage has a cross-sectional area greater than that of the cladding of the optical fiber, where the optical fiber is at least partially free to move around in the open space. In a 10-meter-long section of the optical fiber cable lying straight and flat, at 20° C. and not under tension, the optical fiber in the passage thereof has a length greater than or equal to 10 meters and less than 10.05 meters.

According to an Aspect B2, with the optical fiber cable of Aspect B1, movement of the optical fiber in the passage of the jacket is partially constrained by a water-blocking element.

According to an Aspect B3, with the optical fiber cable of Aspect B1 or B2, the water-blocking element comprises superabsorbent polymer.

According to an Aspect B4, with the optical fiber cable of any one of Aspects B1 to B3, at least two of the strength members are positioned along the preferential bend axis of the optical fiber cable, are embedded in the jacket, and comprise rods of glass-reinforced polymer. The rods have a cross-sectional diameter greater than the cladding of the optical fiber. Accordingly, the strength members mitigate effects on the optical fiber of crushing of the optical fiber cable.

According to an Aspect C1, an optical fiber cable comprises a jacket comprising a polymer. The jacket at least partially surrounds a passage extending lengthwise therethrough, and the passage has open space therein. The cable further comprises strength members coupled to the jacket, where the strength members have an elastic modulus greater than the polymer of the jacket. The cable comprises a first optical fiber positioned in the passage and comprises a second optical fiber positioned in the passage and bonded to the first optical fiber. The first and second optical fibers each comprise a cladding surrounding capillary tubes, where surfaces of at least some of the capillary tubes surround a hollow core of the respective optical fiber. The hollow core of each of the first and second optical fibers is configured to guide optical signals transmitted therealong. The cable comprises a preferential bend axis around which bending of the optical fiber cable requires less force to accomplish than another axis of the optical fiber cable. A preferential bending axis of the first and second optical fibers bonded to one another extends from the cladding of the first optical fiber, through the hollow core of the first optical fiber, again through the cladding of the first optical fiber, through the bond between the first and second optical fibers, through the cladding of the second optical fiber, through the hollow core of the second optical fiber, and again through the cladding of the second optical fiber. The open space of the passage of the jacket has a cross-sectional area greater than that of the first and second optical fibers and wherein the first and second optical fibers are at least partially free to move around in the open space. When the optical fiber cable bends to a radius of 200 mm around the preferential bending axis thereof, the first and second optical fibers at least partially rotate within the passage such that the preferential bending axis of the first and second optical fibers moves closer into alignment with the preferential bend axis of the optical fiber cable.

According to an Aspect C2, with the optical fiber cable of Aspect C1, when the optical fiber cable bends to a radius of 200 mm around the preferential bend axis thereof, the first and second optical fibers move within the passage toward a neutral axis of the optical fiber cable.

According to an Aspect C3, with the optical fiber cable of Aspect C1 or C2, the cable comprises a length of greater than 10 meters. In a 10-meter-long section of the optical fiber cable lying straight and flat, at 20° C. and not under tension, the first and second optical fibers in the passage thereof each have a length greater than or equal to 10 meters and less than 10.05 meters.

According to an Aspect C4, with the optical fiber cable of Aspect C3, in the 10-meter-long section, the first and second optical fibers each have a length less than 10.02 meters.

According to an Aspect C5, with the optical fiber cable of any one of Aspects C1 to C4, at least two of the strength members are positioned along the preferential bend axis of the optical fiber cable, are embedded in the jacket, and comprise rods of glass-reinforced polymer. The rods have a cross-sectional diameter greater than the cladding of either the first or the second optical fiber.

According to an Aspect D1, an optical fiber assembly comprises a first optical fiber, a second optical fiber bonded to the first optical fiber, a third optical fiber bonded to the second optical fiber, a fourth optical fiber bonded to the third optical fiber, a fifth optical fiber bonded to the fourth optical fiber, and a sixth optical fiber bonded to the fifth optical fiber. The first, second, third, fourth, fifth, and sixth optical fibers each comprise a cladding surrounding capillary tubes. Surfaces of at least some of the capillary tubes of each of first, second, third, fourth, fifth, and sixth optical fibers surround a hollow core of the respective optical fiber. The hollow core of each of the first, second, third, fourth, fifth, and sixth optical fibers is configured to guide optical signals transmitted therealong. The first, second, third, fourth, fifth, and sixth optical fibers each having a weak axis, wherein weak axes of at least two of the optical fibers are within 5° of one another when the assembly is flat with the first, second, third, fourth, fifth, and sixth optical fibers lying side-by-side. The assembly is rolled into a spiral with the first optical fiber in a center thereof.

What has been described above includes examples of one or more embodiments. It is, of course, not possible to describe every conceivable modification or alteration of the above systems, devices, or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. For example, while radius of 200 mm is described herein as an exemplary minimum bend radius for optical fibers disclosed herein, Applicants contemplate that as optical fiber technology advances, optical fibers with microstructures as disclosed herein (e.g., hollow core) will have tighter and tighter minimum bend radii, such that the radius threshold of 200 mm may be replaced by 150 mm, 100 mm, or even 50 mm. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical fiber cable, comprising:
   a jacket comprising a polymer, wherein the jacket at least partially surrounds a passage extending lengthwise therethrough a distance of at least 10 meters, and wherein the passage has open space therein;
   strength members coupled to the jacket, wherein the strength members have an elastic modulus greater than the polymer of the jacket, whereby the strength members bear tensile loading of the optical fiber cable;
   an optical fiber positioned in the passage, wherein the optical fiber comprises a cladding surrounding capillary tubes, and wherein surfaces of at least some of the capillary tubes surround a hollow core of the optical fiber, the hollow core configured to guide optical signals transmitted therealong;
   wherein the cladding of the optical fiber has interior and exterior surfaces, wherein a cross-section of cladding taken orthogonal to length of the optical fiber has a perimeter corresponding to the exterior surface, wherein area of the cross-section within the perimeter is greater than 50 µm$^2$ and less than 1 mm$^2$;
   wherein the cable comprises a preferential bend axis around which bending of the optical fiber cable requires less force to accomplish than another axis of the optical fiber cable,
   wherein at least two of the strength members are positioned along the preferential bend axis of the optical fiber cable;
   wherein the optical fiber comprises a stronger axis and a weaker axis such that loading to bend the optical fiber around the stronger axis is greater than that to bend the optical fiber around the weaker axis;
   wherein the open space of the passage has a cross-sectional area greater than ten times that of the cladding of the optical fiber and wherein the optical fiber is at least partially free to move around in the open space,
   whereby as the optical fiber cable bends the optical fiber cable is configured to facilitate reorientation of the optical fiber within the passage to a lower-stress position and/or orientation relative to another higher-stress position and/or orientation, and to thereby mitigate loss of signals communicated by the optical fiber.

2. The optical fiber cable of claim 1, wherein when the optical fiber cable bends to a radius of 200 mm around the preferential bend axis, the optical fiber at least partially rotates within the passage such that the weaker axis of the optical fiber moves closer to alignment with the preferential bend axis of the optical fiber cable.

3. The optical fiber cable of claim 1, wherein the passage has a height orthogonal to length of the optical fiber cable, wherein the height is at least 1 mm and no more than 6.5 mm.

4. The optical fiber cable of claim 1, wherein when the optical fiber cable bends to a radius of 200 mm around the preferential bend axis, the optical fiber moves within the passage toward a neutral axis of the optical fiber cable.

5. The optical fiber cable of claim 1, wherein the capillary tubes of the optical fiber are connected to the interior surface of the cladding and spaced apart from one another around the interior surface thereof; wherein the stronger axis of the optical fiber passes through the exterior surface of the cladding, a center of the optical fiber, at least one of the capillary tubes, and again through the exterior surface of the cladding.

6. The optical fiber cable of claim 1, wherein when the optical fiber cable bends to a radius of 200 mm around the preferential bend axis, the passage overlays the neutral axis of the optical fiber cable.

7. The optical fiber cable of claim 1, wherein in a 10-meter-long section of the optical fiber cable lying straight and flat, at 20° C. and not under tension, the optical fiber in the passage thereof has a length greater than or equal to 10 meters and less than 10.05 meters.

8. The optical fiber cable of claim 7, wherein in the 10-meter-long section, the optical fiber has a length less than 10.02 meters.

9. The optical fiber cable of claim 7, wherein movement of the optical fiber in the passage of the jacket is partially constrained by a water-blocking element.

10. The optical fiber cable of claim 9, wherein the water-blocking element comprises superabsorbent polymer.

11. The optical fiber cable of claim 7, wherein at least two of the strength members are positioned along the preferential bend axis of the optical fiber cable, are embedded in the jacket, and comprise rods of glass-reinforced polymer, wherein the rods have a cross-sectional diameter greater than the cladding of the optical fiber, whereby the strength members mitigate effects on the optical fiber of crushing of the optical fiber cable.

12. The optical fiber cable of claim 1, wherein the optical fiber is a first optical fiber and the optical fiber cable further comprising a second optical fiber, wherein the second optical fiber comprises a cladding, capillary tubes, and a hollow core configured to guide optical signals transmitted along the second optical fiber; wherein the first and second optical fibers are at least partially bonded to one another; wherein a preferential bending axis of the first and second optical fibers bonded to one another extends from the cladding of the first optical fiber, through the hollow core of the first optical fiber, again through the cladding of the first optical fiber, through the bond between the first and second optical fibers, through the cladding of the second optical fiber, through the hollow core of the second optical fiber, and again through the cladding of the second optical fiber.

13. The optical fiber cable of claim 12, wherein when the optical fiber cable bends to a radius of 200 mm around the preferential bending axis thereof, the first and second optical fibers at least partially rotate within the passage such that the preferential bending axis of the first and second optical fibers moves closer into alignment with the preferential bend axis of the optical fiber cable.

14. The optical fiber cable of claim 12, wherein when the optical fiber cable bends to a radius of 200 mm around the preferential bend axis thereof, the first and second optical fibers move within the passage toward a neutral axis of the optical fiber cable.

15. The optical fiber cable of claim 13, comprising a length of greater than 10 meters, wherein in a 10-meter-long section of the optical fiber cable lying straight and flat, at 20° C. and not under tension, the first and second optical fibers in the passage thereof each have a length greater than or equal to 10 meters and less than 10.05 meters.

16. The optical fiber cable of claim 15, wherein in the 10-meter-long section, the first and second optical fibers each have a length less than 10.02 meters.

17. The optical fiber cable of claim 15, wherein at least two of the strength members are positioned along the preferential bend axis of the optical fiber cable, are embedded in the jacket, and comprise rods of glass-reinforced polymer, wherein the rods have a cross-sectional diameter greater than the cladding of either the first or the second optical fiber.

18. An optical fiber cable, comprising:
a jacket comprising a polymer, wherein the jacket at least partially surrounds a passage extending lengthwise therethrough a distance of at least 10 meters, and wherein the passage has open space therein;
strength members coupled to the jacket, wherein the strength members have an elastic modulus greater than the polymer of the jacket, whereby the strength members bear tensile loading of the optical fiber cable;
an optical fiber positioned in the passage, wherein the optical fiber comprises a cladding surrounding capillary tubes, and wherein surfaces of at least some of the capillary tubes surround a hollow core of the optical fiber, the hollow core configured to guide optical signals transmitted therealong;
wherein the cladding of the optical fiber has interior and exterior surfaces and a thickness therebetween, wherein the thickness is less than 300 μm and greater than 3 μm and wherein the thickness of the cladding varies around the cladding when viewed in cross-section by at least 5%, wherein a cross-section of cladding taken orthogonal to length of the optical fiber has a perimeter corresponding to the exterior surface, wherein area of the cross-section within the perimeter is greater than 50 μm$^2$ and less than 1 mm$^2$, wherein the cladding of the optical fiber is round in cross-section such that roundness thereof is greater than 0.95, where the roundness is defined as $4\pi$ times an area within the perimeter divided by a distance of the perimeter squared;
wherein the cable comprises a preferential bend axis around which bending of the optical fiber cable requires less force to accomplish than another axis of the optical fiber cable,
wherein at least two of the strength members are positioned along the preferential bend axis of the optical fiber cable;
wherein the optical fiber comprises a stronger axis and a weaker axis such that loading to bend the optical fiber around the stronger axis is greater than that to bend the optical fiber around the weaker axis;
wherein the open space of the passage has a cross-sectional area greater than that of the cladding of the optical fiber and wherein the optical fiber is at least partially free to move around in the open space,
whereby as the optical fiber cable bends the optical fiber cable is configured to facilitate reorientation of the optical fiber within the passage to a lower-stress position and/or orientation relative to another higher-stress position and/or orientation, and to thereby mitigate loss of signals communicated by the optical fiber.

19. The optical fiber cable of claim 18, wherein the perimeter of the cladding is an outer perimeter, and wherein the cladding has an inner perimeter corresponding to the interior surface thereof, and wherein the roundness of the outer perimeter is greater than that of the inner perimeter.

20. An optical fiber cable, comprising:
- a jacket comprising a polymer, wherein the jacket at least partially surrounds a passage extending lengthwise therethrough a distance of at least 10 meters, and wherein the passage has open space therein;
- strength members coupled to the jacket, wherein the strength members have an elastic modulus greater than the polymer of the jacket, whereby the strength members bear tensile loading of the optical fiber cable;
- an optical fiber positioned in the passage, wherein the optical fiber comprises a cladding surrounding capillary tubes, and wherein surfaces of at least some of the capillary tubes surround a hollow core of the optical fiber, and wherein the hollow core configured to guide optical signals transmitted therealong;
- wherein the cladding of the optical fiber has interior and exterior surfaces, wherein a cross-section of cladding taken orthogonal to length of the optical fiber has a perimeter corresponding to the exterior surface;
- wherein the hollow core comprises gas therein and wherein the cladding consists more than 50% by volume of a silicate glass, the silicate glass comprising at least 30 mol % silica and further comprises alumina, wherein the silicate glass is at least mostly amorphous, having less than 0.1 vol % crystallinity, wherein the silicate glass of the cladding has a coefficient of thermal expansion greater than that of fused silica over a temperature range of 100-300° C.;
- wherein the cable comprises a preferential bend axis around which bending of the optical fiber cable requires less force to accomplish than another axis of the optical fiber cable,
- wherein at least two of the strength members are positioned along the preferential bend axis of the optical fiber cable;
- wherein the optical fiber comprises a stronger axis and a weaker axis such that loading to bend the optical fiber around the stronger axis is greater than that to bend the optical fiber around the weaker axis;
- wherein the open space of the passage has a cross-sectional area greater than ten times that of the cladding of the optical fiber and wherein the optical fiber is at least partially free to move around in the open space,
- whereby as the optical fiber cable bends the optical fiber cable is configured to facilitate reorientation of the optical fiber within the passage to a lower-stress position and/or orientation relative to another higher-stress position and/or orientation, and to thereby mitigate loss of signals communicated by the optical fiber.

* * * * *